Aug. 19, 1958 G. J. REILLY 2,848,271
TAILBOARD COVER FOR OPEN-ENDED VEHICLES
Filed Oct. 1, 1956
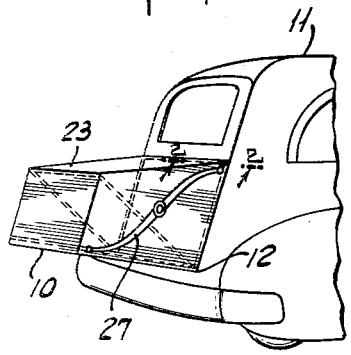
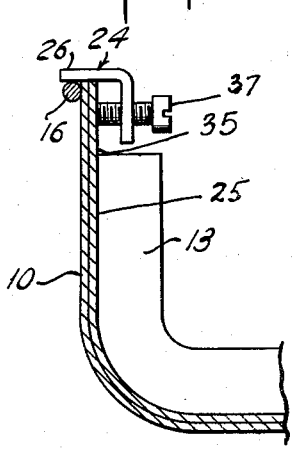
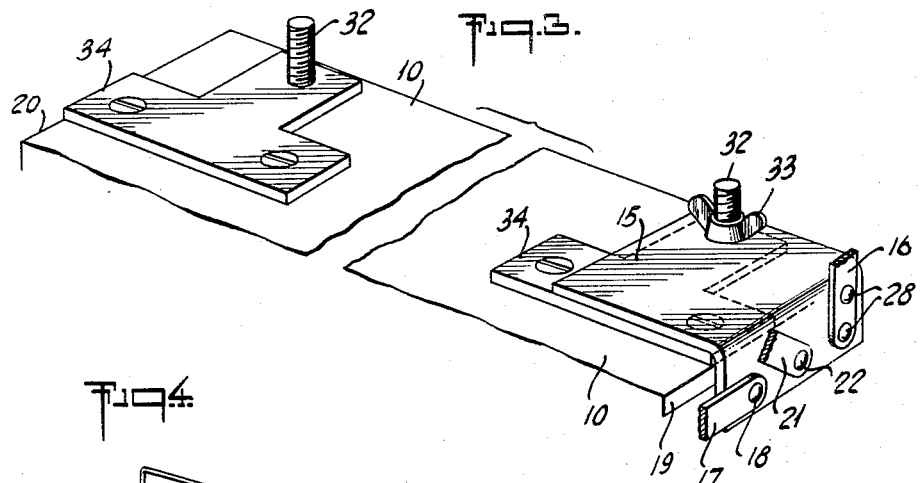
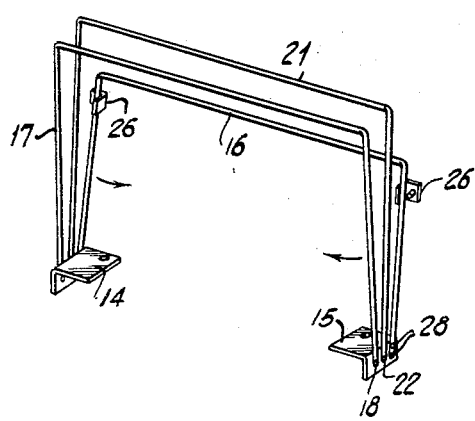
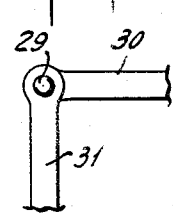
INVENTOR
GERARD J. REILLY
BY
ATTORNEY United States Patent Office 2,848,271
Patented Aug. 19, 1958

2,848,271

TAILBOARD COVER FOR OPEN-ENDED VEHICLES

Gerard J. Reilly, Fort Monmouth, N. J.

Application October 1, 1956, Serial No. 613,271

3 Claims. (Cl. 296—37)

This invention relates to a device adapted for use as a tailboard cover for "station wagons" and other vehicles having a tailboard which, in the "up" position, closes the rear wall opening of the vehicle, and, in the "down" position, provides a horizontal platform beyond the opening.

The present invention provides a cover adapted to close the rear wall opening when the tailboard is in the "down" position and to enclose any articles disposed on said tailboard and protect the same against the elements, is adapted to be readily secured to and removed from the tailboard, and includes a number of novel features of construction which will become apparent from the description below and the accompanying drawing wherein:

Fig. 1 is a fragmentary, perspective view of the rear end of an open ended vehicle, showing the tailboard thereof in the "down" position and the cover of the present invention in place thereon and covering the same.

Fig. 2 is an enlarged, fragmentary, elevational view taken on line 2—2 of Fig. 1, showing a means for securing the first rod of the device of the invention to the inner edge of the rear wall of the vehicle adjacent the opening thereof, to secure the rod thereto, Fig. 3 is a fragmentary, perspective view, showing a fastening such as a pair of threaded members secured to the tailboard adjacent its longitudinal edges, and showing one of a pair of plates secured to said tailboard, Fig. 4 is a schematic view of the rod members of the device of this invention in their closed position, and Fig. 5 is a fragmentary view of a means for connecting the end and transverse portions of the rod members so that said ends may be moved inwardly to collapse the same.

As shown in the drawings, the rear wall 13 of the vehicle 11 has an opening 35 therein and the tailboard 10, pivoted to the vehicle at a point such as 12, is shown in Fig. 1 in its "down position."

Pursuant to the invention, a first rod 16 is (Fig. 3) secured to a plate 15, perpendicularly to the plane of the tailboard for disposition against the rear wall 13 of the vehicle 11. A second rod 17 is movably secured, as at 18, to the plate 15, for rotation to a point such as shown in Figs. 3 and 1, substantially parallel with the longitudinal edges 19, 20 of the tailboard 10; a third rod 21 is secured to the plate 15, as at 22, for rotation to a point intermediate the first and second rods.

The device of the present invention preferably utilizes a pair of plates 14, 15 (Fig. 4) of like construction, one of which is shown enlarged in Fig. 3 and described herein, the description thereof sufficing for both.

A protective covering material 23 (Fig. 1) is suitably secured to the rods 16, 17, 21. Means 24 are provided on the first rod 16 for engagement with the inner edge 25 of the rear wall 13 of the vehicle, adjacent the opening 35 thereof, to secure the first rod thereto. Said means may comprise, as shown in drawings, a bracket 26 secured to the first rod 16 (a pair of such brackets would preferably be secured thereto as shown in Fig. 4) so that a bolt 37 may be threaded through said bracket and bear against the inner edge 25 of the rear wall of the vehicle to thereby secure the first rod thereto. A member 27 is secured to the first and second rods 16, 17 to hold the same selectively in the "open" (Fig. 3) or "closed" position.

The second rod 17 is preferably secured to the plate 15 rearwardly and below the point 22 at which the third rod is secured thereto. The first rod 16 may be rigidly secured to the plate 15, as by bolts 28 or the like. Each of the rods 16, 17 and 21 may comprise a pair of end portions and a connecting transverse portion and means may be provided pivotally connecting the end and transverse portions of the rods so that the ends may be moved inwardly (as indicated by the arrows, Fig. 4) to collapse the same. Said means may consist of pivotally connecting (schematically shown at Fig. 5 at 29), the longitudinal portion 30 to the end portions 31 of said rods.

The plates 14, 15 may be removably secured to the tailboard 10 by passing the same over bolt members 32 which may be secured to the tailboard by any convenient means such as fixtures 34, adjacent the longitudinal edges 19 and 20 thereof and passed through openings of said plates, nut members 33 being threaded over the bolts to secure the plates thereto.

Having thus described my invention, what I claim as new and desire to secure by Letters Patent is:

1. A tailboard cover for an open-ended vehicle having a tailboard provided with spaced longitudinal edges, said tailboard being movable to close said open end of such vehicle, comprising a first U-shaped rod pivotally connected to said tailboard for disposition against the rear wall of the vehicle, a second U-shaped rod pivotally secured to said tailboard for rotation to a point substantially parallel with the longitudinal edge of said tailboard, a third U-shaped rod pivotally secured to said tailboard for rotation to a point intermediate the first and second rods, a protective covering material secured to said rods, a bracket on the first rod, and a bolt passing through the bracket, engageable with the inner edge of the rear wall of the vehicle adjacent the opening thereof to secure the first rod thereto.

2. In a tailboard cover as set forth in claim 1, a member secured to the first and second rods to hold the same selectively in open or closed position.

3. In a tailboard cover as set forth in claim 1, each of said rods comprising a pair of end portions and a connecting transverse portion, and means pivotally connecting the end and transverse portions of said rods.

References Cited in the file of this patent

UNITED STATES PATENTS 2,421,388  Mochan _____ June 3, 1947

OTHER REFERENCES

"Luggage Cover" in "The Autocar Magazine," April 21, 1950, p. 473.